(No Model.) 2 Sheets—Sheet 1.

A. ZISSET.
FERTILIZER DISTRIBUTER.

No. 310,010. Patented Dec. 30, 1884.

WITNESSES:
Geo. H. Fraser.
Geo. Bainson

INVENTOR:
Albert Zisset
By his Attorneys,
Burke Fraser Bennett

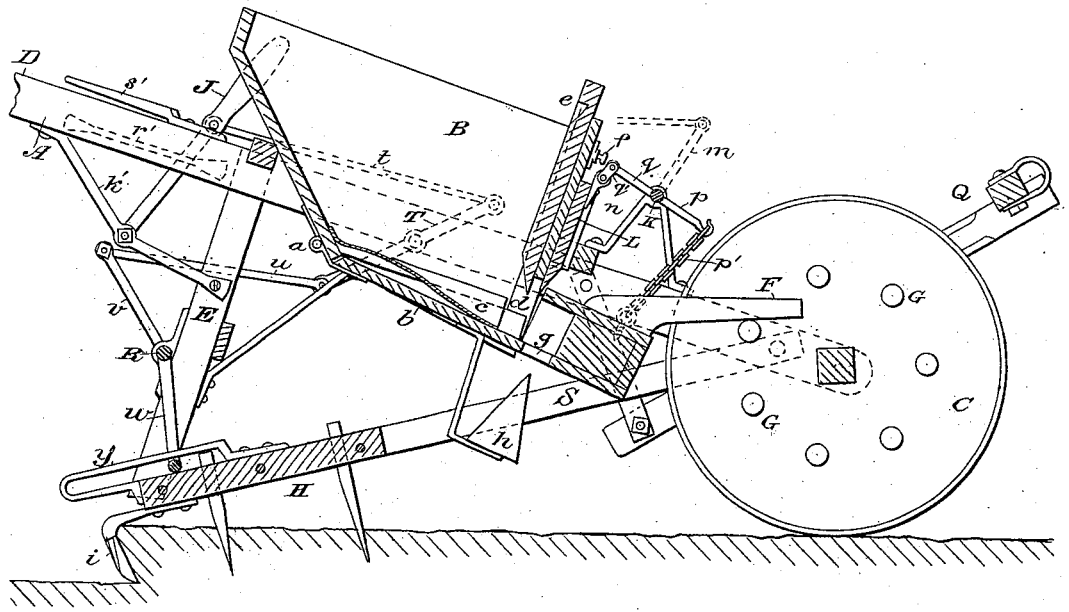

UNITED STATES PATENT OFFICE.

ALBERT ZISSET, OF FLATBUSH, NEW YORK.

FERTILIZER-DISTRIBUTER.

SPECIFICATION forming part of Letters Patent No. 310,010, dated December 30, 1884.

Application filed March 12, 1884. (No model.)

*To all whom it may concern:*

Be it known that I, ALBERT ZISSET, a citizen of the United States, residing at Flatbush, in the county of Kings and State of New York, have invented certain new and useful Improvements in Fertilizer-Distributers, of which the following is a specification.

My improved machine is designed to facilitate the distribution of fertilizers, particularly those of a dry or granular character, over a field before planting. In its general features the machine resembles a wheelbarrow, and in operation it is designed to be drawn by a horse and controlled by the handles in similar manner to a plow. It is provided with an agitator for shaking out the fertilizer, with a spreader for scattering the same as it falls from the machine, and with a harrow or drag for working the fertilizer into the soil.

The particular features to which my invention relates are the means for raising the harrow in order to throw it out of action, and the mechanism for stopping the action of the fertilizer-dropper and thereby preventing the further distribution of fertilizer.

Figure 1:
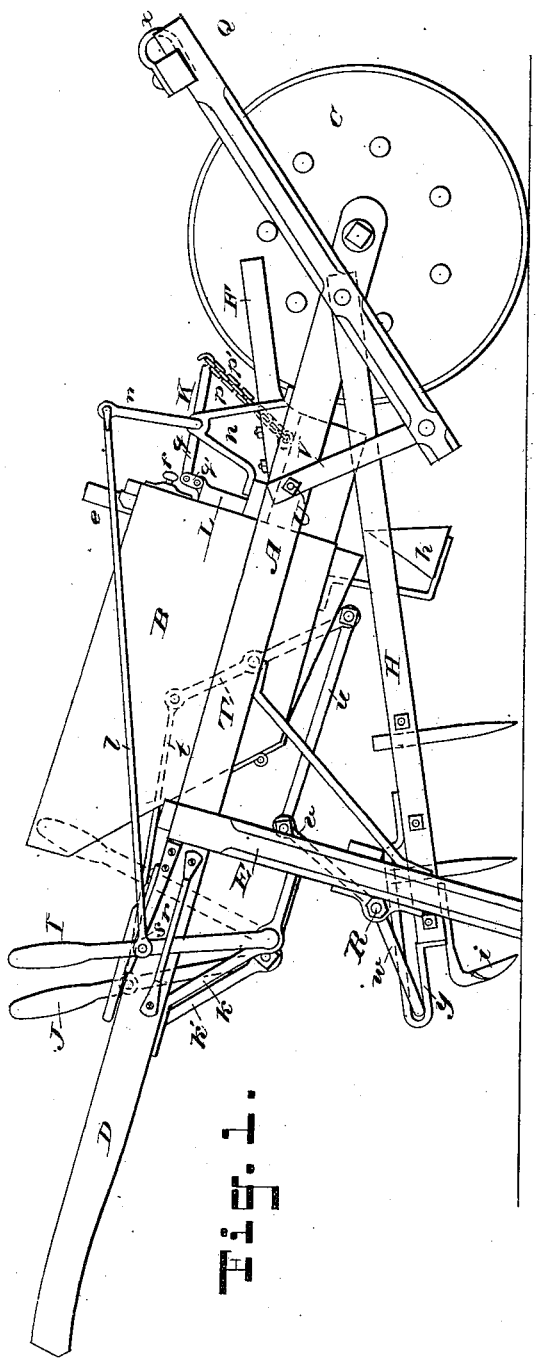
Figure 2:
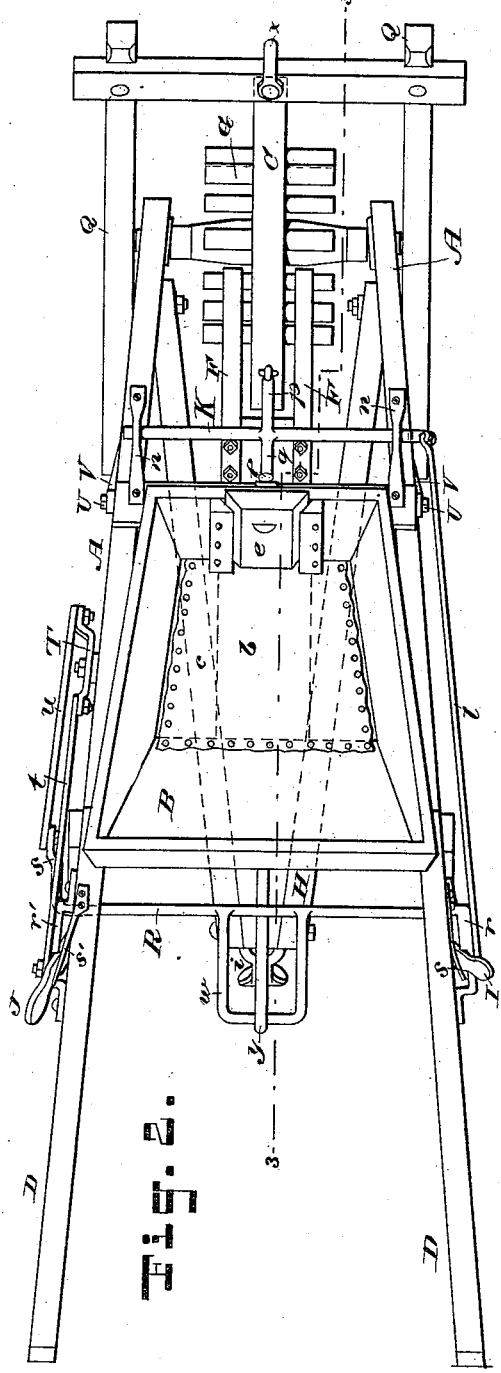

Figure 1 of the accompanying drawings is a side elevation of my improved machine. Fig. 2 is a plan thereof, and Fig. 3 is a vertical longitudinal section, the plane of which is denoted by the dotted line 3 3 in Fig. 2.

Let A designate the frame-work of the wheelbarrow, B the box thereof, C the front wheel, D D the two handles, and E E the two legs. These parts are constructed in very similar manner to ordinary wooden wheelbarrows, and hence require no particular description. The box B is designed to hold the fertilizer, and in its front board is formed the outlet-aperture $d$, through which the fertilizer escapes. This is provided with a slide, $e$, which may be raised or lowered to adjust the area of the opening, and which is held by a set-screw, $f$, in front. A portion, $b$, of the bottom of the box is hinged at $a$, Fig. 3, at the back, and through its front portion a delivery-opening, $g$, is formed in communication with the opening $d$. Two finger-bars, F F, are fastened at the front of the bottom $b$ and project forward on each side of the wheel, Fig. 2. The bottom $b$ and finger-bars F constitute the shaker S. The wheel is provided with pins G G, fixed transversely in it and projecting to both sides. As the wheel turns these pins successively lift the fingers F F and drop them, thereby agitating the bottom $b$, and consequently agitating the entire mass of fertilizer in the box, and causing it to pass out at the opening $d$ and fall from the delivery-opening $g$, Fig. 3. The entire bottom of the box is covered with leather or other flexible material, $c$, in order that none of the fertilizer may escape through the cracks or except through the outlet $d$. Directly beneath the delivery-opening $g$ is a cone, $h$, on which the fertilizer falls, and which scatters or spreads it. This is called the "spreader." Beneath the machine is a harrow or drag, H, the teeth of which serve to stir the earth and turn in or partially bury the fertilizer. At the front of the machine is a frame consisting of two oblique side bars, with a cross-bar connecting their ends, to the middle of which cross-bar is attached an eye, $x$, to which to hitch the horse. The draft-connection may be raised or lowered by tilting the frame Q on its center by setting the bolts U U, Fig. 2, in different holes of the bars V V, Fig. 1.

The machine as thus far described is not new with me.

I will now proceed to describe my improvements.

It is desirable to be able to throw the machine completely out of action at times, so as not only to lift the harrow out of the earth but also to lift the shaker off from the pins and close the outlet-opening, in order that none of the fertilizer may escape. These operations I effect by means of the two hand-levers I and J at the rear, connected through suitable mechanism with the harrow and shaker, respectively. The lever I is at the right-hand side, is fulcrumed to a frame or bracket, $k$, Fig. 1, and is connected by a rod, $l$, with an arm, $m$, on a rock-shaft, K, at the front. This shaft K extends across the machine, Fig. 2, and is mounted in bearing brackets $n$ $n$. At its middle it is formed with a cross-bar or two radial arms, $p$ and $q$. The arm $p$ projects to the front, and terminates in a hook, to which is connected a chain, $p'$, the other end of which is connected to the shaker. The arm $q$ projects to the rear, and its end is connected by a link, $q'$, with a slide, L, Fig. 3, which is arranged to move in guides in the front side of the front board of the box B, and which, when slid down, covers and closes the opening d. When the lever I is pulled back, as shown in full lines in Fig. 1, it is held in that position by entering a notch in a plate, r, Fig. 2, being pressed into the same by a flat spring, s. When the lever I is in this position, the arm p is turned up, thus pulling the chain p' and lifting the shaker until its fingers F are above the pins G G, as shown in Fig. 1, and the arm q is turned down, so that it forces down the slide L, and the latter closes the outlet-opening d. Thus when the lever I is pulled back the dropping of the fertilizer stops. When the lever I is pushed forward, as shown in dotted lines in Fig. 1, the slide L is lifted and the shaker is dropped until its fingers F rest on the pins G G. The lever J is on the left hand of the machine, and is fulcrumed to a frame or bracket, k', Fig. 3. To it is jointed a rod, t, which extends forward and connects with the upper end of a lever, T, (shown in dotted lines in Fig. 3,) and the lower end of this lever is connected through a rod, y, to an arm, v, on a rock-shaft, R, which extends across the machine and is mounted in bearings fixed to the lugs E E. On the middle of this rock-shaft R is formed a U-shaped arm or crank, w, the bend of which passes under a bar or strap, y, on the harrow. This lever J, like the lever I, works in a guide, r', Fig. 2, which has a retaining-notch to hold the lever when pulled back, and a spring, s', to press it laterally into said notch. When lever J is pulled back, as shown in Fig. 1, the shaft R stands so that its arm w is turned toward the rear and lifts and upholds the harrow; but when the lever J is thrown forward, as shown in Fig. 3, the shaft R is rocked and its arm w is turned down, thus dropping the harrow. When the harrow is lowered thus, the arm w stands about at right angles to it, so that the weight of the machine and its load of fertilizer may press downward upon the harrow, being transmitted through this arm w without having any tendency to turn the arm backward. Thus it will be apparent that when both levers I and J are pulled back the machine is wholly inoperative, and may be wheeled around like any common wheelbarrow; but when both levers are pushed forward the machine is fully operative, and as it is drawn forward by the horse it will drop out the fertilizer and harrow it into the ground. This arrangement of levers to perform these functions is very convenient, as they are brought within easy reach of the person operating the machine, who follows it like a plow, guiding it by the handles D D. When the end of a furrow is reached, he has only to pull both levers back before turning around to travel back on the next furrow.

One of the levers might be omitted, and all of the connections made with the other lever alone, so that only one lever would have to be operated; but two levers are preferable, for the reason that it is sometimes desirable to distribute a fertilizer without covering it in by the harrow, in which case the harrow will be left raised.

I provide the harrow at its rear end with a cultivator point or shovel, i, preferably arranged in the middle, which, when the harrow is lowered, enters the earth, and, acting on the soil which has already been loosened by the passage through it of the harrow-teeth, plows a small trench or furrow, as seen in Fig. 3, to receive the seed in planting. This constitutes an important feature of my invention, as it enables a farmer with my machine to fully prepare the soil for planting at one operation after the plowing has been done. It also facilitates the planting in straight and even rows.

I claim as my invention—

1. The combination, with a fertilizer-distributer, of slide L, lever I, rod l, and rock-shaft K, having arms m, p, and q, the arm p connected to the shaker and the arm q connected to said slide, substantially as set forth.

2. In a fertilizer-distributer, the combination of frame A, harrow H, pivoted thereto at the front, strap y on said harrow at the rear, shaft R, crank-arm w thereon engaging said strap and arranged substantially as shown, whereby when it is turned down it stands at right angles to the plane of the harrow-frame and resists endwise the lifting of the latter, thereby holding it down, and when it is turned up it slides in said strap and lifts the harrow, hand-lever J, and mechanism intervening between lever J and shaft R, whereby the movement of the former serves to oscillate the latter and turn the crank-arm up or down, substantially as set forth.

In witness whereof I have hereunto signed my name in the presence of two subscribing witnesses.

ALBERT ZISSET.

Witnesses:
 ARTHUR C. FRASER,
 HENRY CONNETT.